(12) United States Patent
Wang

(10) Patent No.: US 10,491,750 B2
(45) Date of Patent: Nov. 26, 2019

(54) METHOD AND COMMUNICATION APPARATUS FOR SHARING A SERIES OF NUMBERS DURING A CALL

(71) Applicant: Wistron Corporation, New Taipei (TW)

(72) Inventor: Xiao-Qun Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/145,808

(22) Filed: May 4, 2016

(65) Prior Publication Data
US 2017/0237861 A1 Aug. 17, 2017

(30) Foreign Application Priority Data
Feb. 17, 2016 (CN) .......................... 2016 1 0090250

(51) Int. Cl.
*H04M 7/00* (2006.01)
*H04M 3/42* (2006.01)

(52) U.S. Cl.
CPC ..... *H04M 7/0045* (2013.01); *H04M 3/42221* (2013.01); *H04M 2201/40* (2013.01)

(58) Field of Classification Search
CPC ......... H04M 7/00454; H04M 1/22477; H04M 2201/40
USPC .......... 455/414.1, 415, 418, 566, 567, 550.1
See application file for complete search history.

(56) References Cited

U.S. PATENT DOCUMENTS

| 2005/0197109 A1* | 9/2005 | Kim .................. H04M 3/42008 455/415 |
| 2007/0121860 A1* | 5/2007 | Liang .................... H04M 1/723 379/158 |
| 2007/0189482 A1* | 8/2007 | Erb ......................... H04M 3/46 379/158 |
| 2009/0036149 A1* | 2/2009 | Liu .................. H04M 1/274516 455/466 |
| 2009/0198777 A1* | 8/2009 | LaFreniere ......... H04L 12/5875 709/206 |

(Continued)

FOREIGN PATENT DOCUMENTS

| CN | 102047647 | 5/2011 |
| CN | 103442119 | 12/2013 |

(Continued)

OTHER PUBLICATIONS

"Office Action of Taiwan Counterpart Application," dated Apr. 24, 2017, with English translation thereof, p. 1-p. 9.

(Continued)

*Primary Examiner* — Nghi H Ly
(74) *Attorney, Agent, or Firm* — JCIPRNET

(57) ABSTRACT

A method and a communication apparatus for sharing a series of numbers during a call are provided. In the method, the communication apparatus establishes a call with another communication apparatus, and performs a recognition procedure on a voice in the call to recognize a series of numbers appeared in the voice, so as to display the recognized series of numbers on a display of the communication apparatus. Then, an operation of a user is received and accordingly the series of numbers is sent to the another communication apparatus so as to display the series of numbers on the another communication apparatus.

19 Claims, 5 Drawing Sheets

(56) References Cited

U.S. PATENT DOCUMENTS

| | | | |
|---|---|---|---|
| 2009/0299743 A1 | 12/2009 | Rogers | |
| 2013/0244628 A1* | 9/2013 | Davis, III | H04L 67/306 |
| | | | 455/414.1 |
| 2013/0288649 A1* | 10/2013 | Dave | H04M 1/274533 |
| | | | 455/414.1 |
| 2014/0051399 A1* | 2/2014 | Walker | H04L 65/1083 |
| | | | 455/412.1 |
| 2014/0221053 A1* | 8/2014 | Jin | H04M 1/72583 |
| | | | 455/567 |

FOREIGN PATENT DOCUMENTS

| | | |
|---|---|---|
| CN | 104486492 | 4/2015 |
| JP | 02007288663 A * | 11/2007 |

OTHER PUBLICATIONS

"Office Action of China Counterpart Application," dated May 5, 2019, p. 1-p. 8.

* cited by examiner

METHOD AND COMMUNICATION APPARATUS FOR SHARING A SERIES OF NUMBERS DURING A CALL

CROSS-REFERENCE TO RELATED APPLICATION

This application claims the priority benefit of China application serial no. 201610090250.8, filed on Feb. 17, 2016. The entirety of the above-mentioned patent application is hereby incorporated by reference herein and made a part of this specification.

BACKGROUND OF THE INVENTION

1. Field of the Invention

The invention relates to a communication method and an apparatus, and more particularly, relates to a method and a communication apparatus for sharing a series of numbers during a call.

2. Description of Related Art

During a call, either side of the call may often ask the opposite side to record certain important numbers (e.g., phone number, social security number, credit card number) mentioned in the call. The user may usually found that there is no pen and paper nearby for recording the numbers. If the user intends to record the numbers directly by using the phone, a call interface must be minimized so a recording program may be started since the phone screen is usually covered by the call interface. Also, the call is to be paused since the ear is away from the phone during aforesaid operation.

In the case of a long series of numbers, the user is normally unable to remember the numbers (or listen clearly to them) all at once by the first time, and thus the numbers cannot be recorded completely unless the numbers are repeated multiple times by the opposite side. What is even more inconvenient is that, the user may have to repeat the numbers again so the opposite side can confirm the numbers after the recording is finally completed. Only by doing so, the correctness of the recorded numbers can then be ensured. In view of the above, it is obvious that the current method for recording a series of numbers during the call is inconvenient in operation for the user.

SUMMARY OF THE INVENTION

The invention is directed to a method and a communication apparatus for sharing a series of numbers during a call, which allows the user to easily share the series of numbers during the call.

The method for sharing a series of numbers during a call of the invention is adapted to a communication apparatus with a calling function. The method includes the following steps. First of all, a call with another communication apparatus is established. Next, a recognition procedure is performed on a first voice in the call and a series of numbers appeared in the first voice is recognized so as to display the recognized series of numbers on a display of the communication apparatus. Then, an operation of a user is received and accordingly the series of numbers is sent to the another communication apparatus so as to display the series of numbers on the another communication apparatus.

The communication apparatus of the invention includes a communication module, a display, an input device, a storage device and a processor. The communication module is configured to establish a call with another communication apparatus. The storage device is configured to store a plurality of modules. The processor is coupled to the communication module, the display, the input device and the storage device, and configured to load and execute the modules in the storage device. The modules include a voice recognition module, a display module and a sharing module. The voice recognition module can recognize a series of numbers appeared in a first voice in the call; the display module can display the series of numbers recognized by the voice recognition module on the display; the sharing module can receive an operation of a user by using the input device and accordingly send the series of numbers to the another communication module by using the communication module so as to display the series of numbers on the another communication module.

Based on the above, according to the method and the communication apparatus for sharing a series of numbers in a call provided by the invention, the series of numbers appeared in the voice of the user may be recognized during the call, so that the recognized series of numbers may then be displayed on the screen for the user to confirm the correctness. Moreover, the user can choose to transmit the recognized series of numbers to the opposite side so the series of numbers may be displayed on the screen of the opposite side or recorded into a call record of the opposite side for the opposite to inquire.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
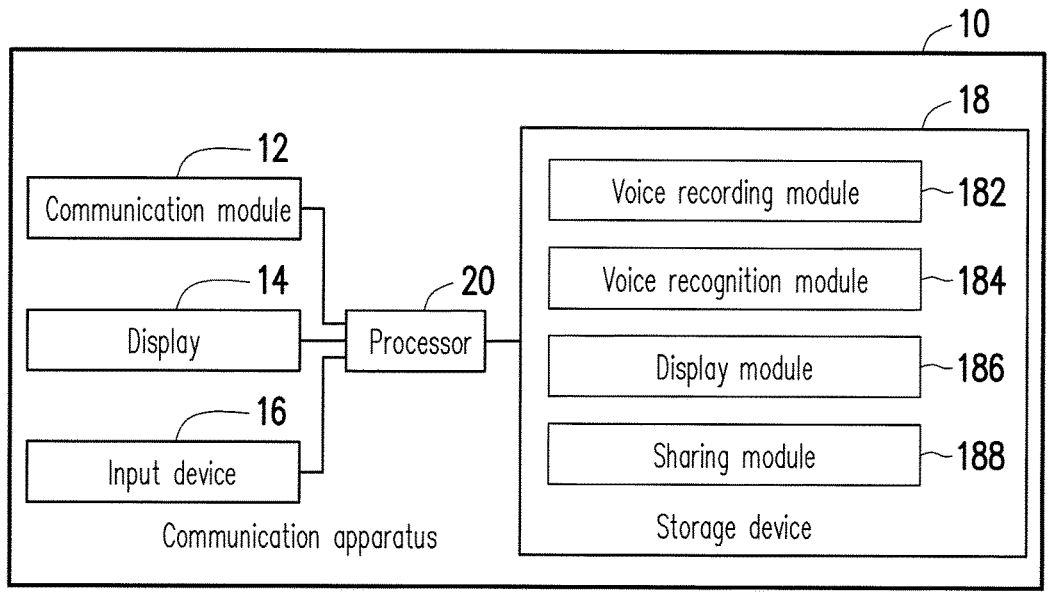
FIG. 1 is a block diagram illustrating a communication apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present application, a voice recognition is activated during a call, so that the recorded voice may then be recognized. If a series of numbers (e.g., phone number, card number) is mentioned in the voice, the communication apparatus may smartly find out the series of numbers and simultaneously display the same on the call interfaces of both sides. After the call is ended, the series of numbers mentioned in the call may be displayed in the call records in the phones of both sides. As such, the user no longer needs to manually record the numbers, or repeatedly listen to the voice (or send short message for confirming the numbers).

FIG. 1 is a block diagram illustrating a communication apparatus according to an embodiment of the invention. Referring to FIG. 1, a communication apparatus 10 of the present embodiment is, for example, an electronic apparatus with a calling function, such as a cell phone, a tablet computer, a personal computer or the like. The communication apparatus 10 includes a communication module 12, a display 14, an input device 16, a storage device 18 and a processor 20, and their functions are respectively described as follows.

The communication module 12 is configured to communicate with other communication apparatuses, and supports at least one of the following wireless communication technologies: Global System for Mobile Communication (GSM) system, Personal Handy-phone System (PHS), Code Division Multiple Access (CDMA) system, Wireless fidelity (Wi-Fi) system, Worldwide Interoperability for Microwave Access (WiMAX) system, Radio Repeater or Radio Broadcaster, but the present application is not limited to the above.

The display 14 is a display that adopts, for example, LCD (Liquid Crystal Display), LED (Light-Emitting Diode) display, FED (Field Emission Display) or other panels as a display panel and uses a LED as the backlight module. The input device 16 is, for example, a device capable of receiving operations of the user, such as a mouse, a keyboard, a joystick or a touch pad. The input device 16 may also be a touch sensing element of resistance type, capacitive type, optical type or other types, which may be integrated with the display 14 to form a touch screen capable of receiving a touch operation of the user.

The storage unit 18 may be a fixed or a movable device in any possible forms including a random access memory (RAM), a read-only memory (ROM), a flash memory or other similar devices, or a combination of the above-mentioned devices. In the present embodiment, the storage device 18 is configured to record a voice recording module 182, a voice recognition module 184, a display module 186 and a sharing module 188. Those modules are, for example, computer programs stored in the storage device 18 which may be loaded into the processor 20, so that the processor 20 may accordingly execute functions for sharing a series of numbers during a call provided in the embodiments of the present application. Those modules may be integrated into one specific application program (APP). It is also possible that only a part of the modules is included in the specific APP and related to the rest of modules, or the modules belong to different APPs and related to one another.

The processor 20 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 20 is connected to the communication module 12, the display 14, the input device 16 and the storage device 18, and capable of loading the programs including the voice recording module 182, the voice recognition module 184, the display module 186 and the sharing module 188 from the storage device 18 in order to execute the method for sharing a series of numbers during a call provided in the embodiments of the present application. Various embodiments are provided below and served to describe detailed step of said method.

Figure 2:
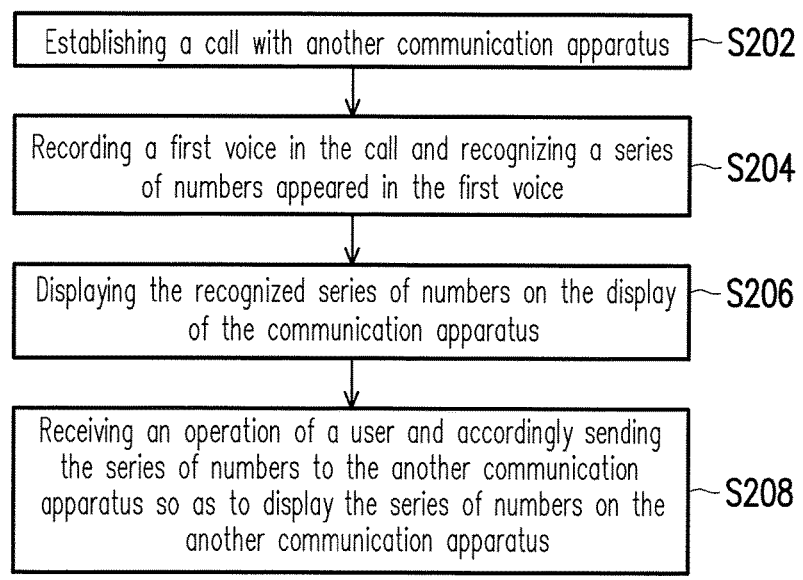
FIG. 2 is a flowchart illustrating a method for sharing a series of numbers during a call according to an embodiment of the invention.

FIG. 2 is a flowchart illustrating a method for sharing a series of numbers during a call according to an embodiment of the invention. Referring to FIG. 1 and FIG. 2 together, the method of present embodiment is adapted to the communication apparatus 10 in FIG. 1. Detailed steps of the method for sharing a series of numbers during a call in the present embodiment are described below with reference to various devices in the communication apparatus 10 in FIG. 1.

First of all, a call with another communication apparatus is established by using the communication module 12 (step S202). For example, the "call" is established after a phone call is made by the user to the another communication apparatus by using the communication apparatus 10 and the phone call is picked up by the user of the another communication apparatus, or established after a phone call from the another communication apparatus is answered by user by using the communication apparatus 10. Herein, the user makes the phone call or answers the phone call by, for example, pressing a touch button displayed on the display 14 or a physical button disposed on the communication apparatus 10, and the present embodiment is not limited thereto.

Next, a voice recognition function is activated. In the present embodiment, when the voice recognition function is activated, a first voice in the call is recorded by the voice recording module 182, and a series of numbers appeared in the first voice recorded by the voice recording module 182 is recognized by the voice recognition module 184 (step S204). Herein, the voice recording module 182 starts recording the first voice, for example, right after the call is established or starts recording the first voice when a record function is activated according to a record operation performed by the user after the call is established, and the invention is not limited thereto. For instance, after the call is established, the communication apparatus 10 displays, for example, a call interface on the display 14 in which a plurality of functional buttons are included. At the time, the user may press a record button during the call based on demands so the recording function may be activated to start recording the first voice. In other embodiments, it is not required to perform a voice record function when the voice recognition function is activated. Instead, a real-time voice recognition (which will be described later) may be automatically performed by the voice recognition module 184 after the call is established, or the real-time voice recognition may be performed by the voice recognition module 184 only after receiving an operation of the user.

It should be noted that, before performing the voice recognition, the voice recognition module 184 may record voices of numbers 0 to 9 in advance for the communication apparatus 10. As such, audio files of said voices may be recorded into a voice database, and relations between the audio files and the corresponding numbers or number pictures may also be established in the voice database. By doing so, later, when receiving the first voice in the call in real-time or receiving the first voice recorded by the voice recording module 182, the voice recognition module 184 may recognize the numbers in the first voice by matching each audio section in the first voice with the audio files in the database and select the corresponding numbers or the number pictures as the recognized numbers to be displayed on the display 14. Moreover, in order to adapt different languages or accents used for speaking the numbers by the users in different nations or regions, the communication apparatus 10 may provide the voices of the numbers 0 to 9 with unique accents (which may be recorded by the user in advance) as replacement to a standard voice audio file pre-stored in the voice database or provide a personal voice audio file different from the standard voice audio file.

On the other hand, in an embodiment, the voice recognition module 184 may directly consider the numbers consecutively read by the user as a series of numbers. In another embodiment, the voice recognition module 184 may further determine whether the numbers consecutively read by the user can constitute the series of numbers by using a preset time interval. For instance, in the case where the preset time interval is one second, if a time interval between two numbers consecutively read by the user does not exceed one second, it may be determined that said two numbers can constitute the series of numbers. By analogy, in a series of numbers consecutively read by the user, if all the time intervals between adjacent numbers do not exceed one second, it may be determined that those numbers can constitute the series of numbers. Conversely, once the time interval between two numbers consecutively read by the user exceeds one second, the voice recognition module 184 does not determine the two numbers as the series of numbers.

After the series of numbers is recognized by the voice recognition module 184, the recognized series of numbers is displayed on the display 14 by the the display module 186 (step S206). Herein, the purpose of displaying the series of numbers is to allow the user to confirm whether the numbers recognized by the voice recognition module 184 is correct.

It is worth mentioning that, in an embodiment, while the display module 186 is displaying the series of numbers recognized by the voice recognition module 184, the communication apparatus 10 further sends the recognized series of numbers to another communication apparatus through the sharing module 188 by using the communication module 12 so the numbers may be displayed on a display of the another communication apparatus. Accordingly, the user of the another communication apparatus may assist in confirming whether the numbers recognized by the voice recognition module 184 is correct according to the heard voice which is read by the user of the communication apparatus 10. It should be noted that, the series of numbers sent to the another communication apparatus through the sharing module 188 is merely used for a temporary display without leaving records in the another communication apparatus. However, in other embodiments, besides displaying, the series of numbers sent to the another communication apparatus may also be stored, automatically or in response to the operation of the user, into the call record or a suitable recording medium.

It is noted that, the method used by the sharing module 188 for sending the series of numbers includes, for example, sending the series of numbers in form of a short message by using a cellular network. Alternatively, if the communication module 12 of the communication apparatus 10 includes a wireless network module (not illustrated) such as a WiFi module (or Bluetooth, Beacon, NFC) and is able to connect to a wireless network, the sharing module 188 may transmit the series of numbers in form of a social network instant message by using the Internet. More preferably, before sending the series of numbers, the sharing module 188 may determine whether a connection to the wireless network is established by the wireless network module. By doing so, if said connection is established, the series of numbers may be transmitted in form of the instant message to the another communication apparatus by using the wireless network module; if said connection to the wireless network is not established, the series of numbers may be transmitted in form of the short message to the another communication apparatus by using the communication module 12. For the another communication apparatus, regardless of what received is the short message or the instant message, the series of numbers contained therein may be retrieved and displayed on the display for the user to confirm.

Lastly, the sharing module 188 may receive an operation of the user by using the input device 16 and accordingly send the recognized series of numbers to the another communication apparatus by using the communication module 12, so that the series of numbers may be displayed on the display of the another communication apparatus (step S208) or even stored into the another communication apparatus. Specifically, the sharing module 188 may receive a send operation of the user by using the input device 16, for example, so that the series of numbers recognized by the voice recognition module 184 may be sent to the another communication apparatus and displayed on the display of the another communication apparatus. Herein, the sharing module 188 may also send the series of numbers in form of the short message or the instant message as described above, and the related description is not repeated herein. On the other hand, the sharing module 188 may further receives a cancel operation of the user by using the input device 16, for example, so as to cancel sending the series of numbers recognized by the voice recognition module 184 to the another communication apparatus.

It should be noted that, in an embodiment, the sharing module 188 may send the recognized series of numbers to the another communication apparatus when a physical send button disposed on the communication apparatus 10 is pressed by the user. In another embodiment, the display module 186 may add a plurality of functional buttons (e.g., a send button and a cancel button) to the call interface displayed by the display 14 after the call is established, or after the series of numbers is recognized by the voice recognition module 184. When receiving a touch operation of the user on the send button by using the input device 16, the sharing module 188 sends the series of numbers recognized by the voice recognition module 184 to the another communication apparatus; when receiving a touch operation of the user on the cancel button by using the input device 16, the sharing module 188 cancels the sending.

Figure 3:
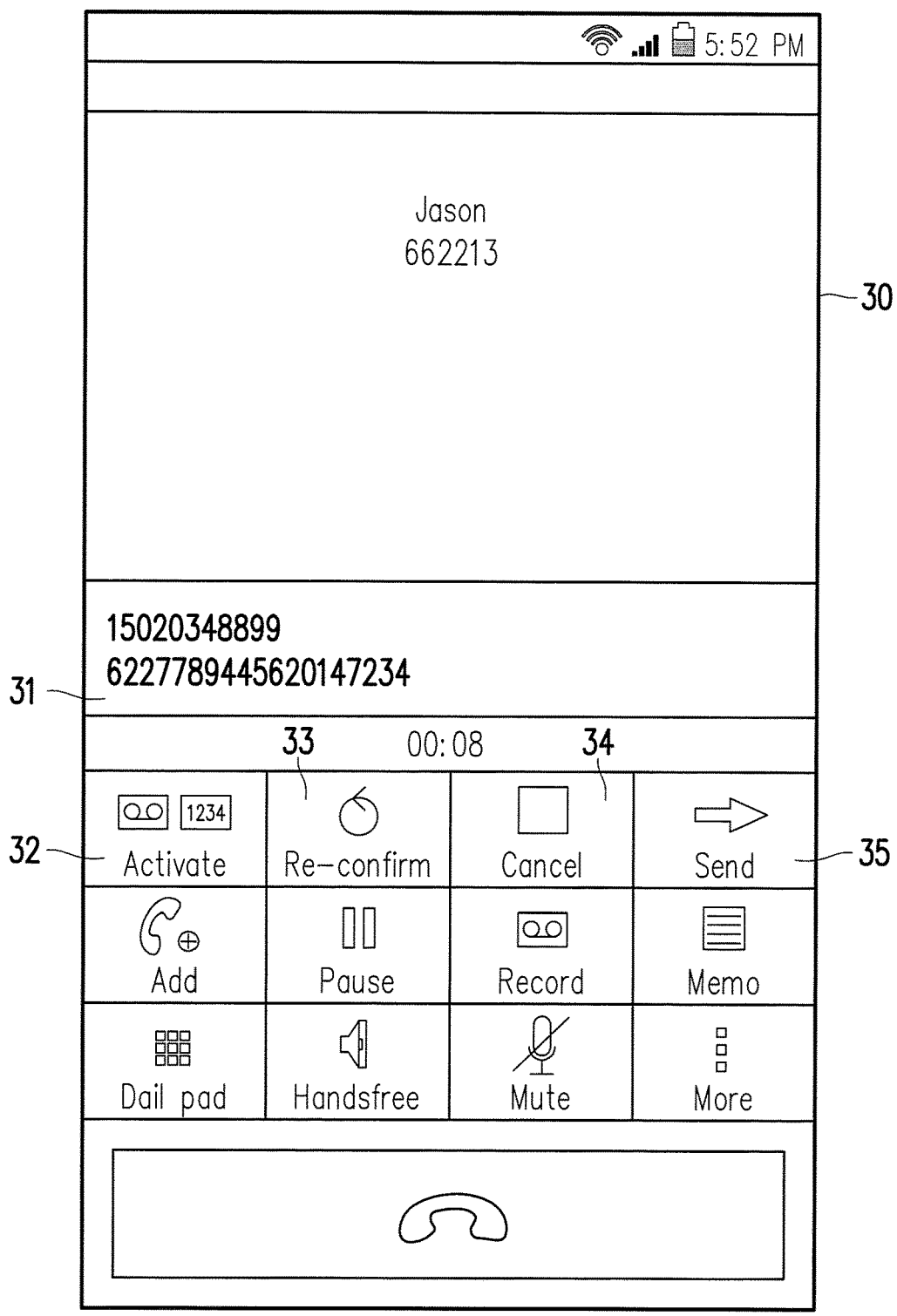
FIG. 3 is an example of a user interface for sharing a series of numbers during a call according to an embodiment of the invention.

For instance, FIG. 3 is an example of a user interface for sharing a series of numbers during a call according to an embodiment of the invention. Referring to FIG. 3, the present embodiment illustrates a call interface 30 displayed on a communication apparatus of a user Joe after a call is established with a contact Jason by using the communication apparatus. Herein, in addition to the contact name (i.e. Jason) and the phone number (i.e. 662213), a plurality of functional buttons are further displayed at lower portion of the call interface 30, wherein the functional buttons include an activate button 32, a re-confirm button 33, a cancel button 34, a send button 35 and so on. During the call, the user may tap the activate button 32 to control the communication apparatus to activate a recognition procedure for a voice in the call and recognize a series of numbers (e.g., 15020348899 and 6227789445620147234) appeared in the voice, so that the recognized series of numbers may be displayed on a series of numbers display region 31 in the call interface 30.

Figure 4:
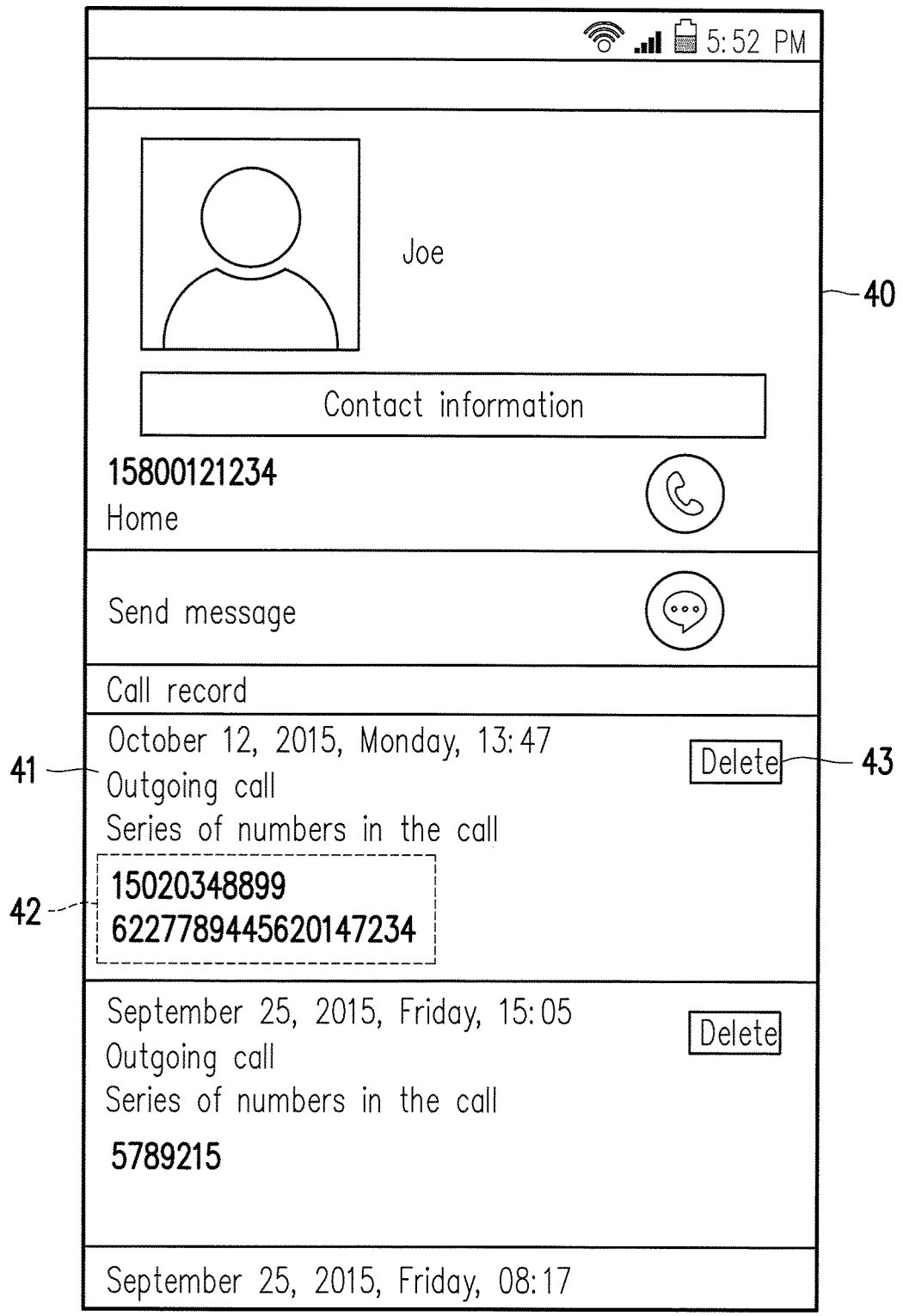
FIG. 4 is an example of a user interface for sharing a series of numbers during a call according to an embodiment of the invention.

Further, the user may tap the send button 35 during the call or after the call is ended, so as to send the recognized series of numbers to a communication apparatus of the contact Jason. For instance, FIG. 4 is an example of a user interface for sharing a series of numbers during a call according to an embodiment of the invention. Referring to FIG. 4, when the communication apparatus of the contact Jason receives the series of numbers sent by the communication apparatus of the user, the series of numbers is recorded into a call record of Jason's with respect to the user (i.e. Joe). Accordingly, after opening a contact information interface 40 of Joe, the contact Jason may then read the series of numbers 42 sent by Joe in the call in the call record 41 at the lower portion. It is noted that, the contact information interface 40 further includes a delete button 43 in the call record 41, which allows the contact Jason to delete the call record 41. With aforesaid mechanism for recognizing, sending and recording the series of numbers, the contact Jason is able to easily obtain and search the numbers that Joe intended to transmit without suffering through the trouble of manually recording the numbers during the call.

Referring back to the embodiment of FIG. 3, the user may also tap the cancel button 34 to cancel sending the recognized series during the call or after the call is ended, so as to avoid leaving records in the communication apparatus of the opposite side (i.e. Jason). Further, if the series of numbers read by the user is overly long and the user does not wish to manually confirm those numbers by eyes, the re-confirm button 33 may be tapped. Then, the communication apparatus may record a voice and recognize a series of numbers once again to be compared with the previously recognized series of numbers and followed by displaying a comparison result thereof.

Figure 5:
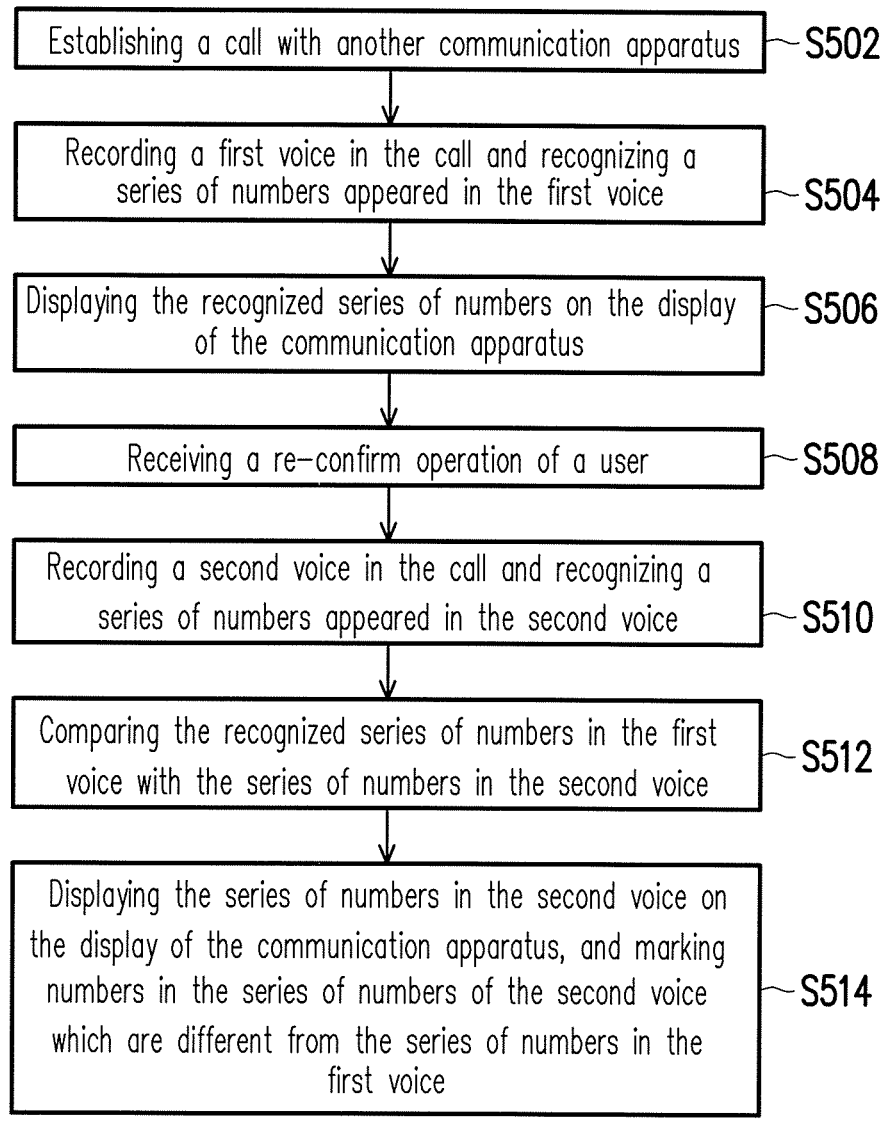
FIG. 5 is a flowchart illustrating a method for sharing a series of numbers during a call according to an embodiment of the invention.

Specifically, FIG. 5 is a flowchart illustrating a method for re-confirming the series of numbers according to an embodiment of the invention. Referring to FIG. 1 and FIG. 5 together, the method of present embodiment is adapted to the communication apparatus 10 in FIG. 1. Detailed steps of the method for sharing a series of numbers during a call in the present embodiment are described below with reference to various devices in the communication apparatus 10 in FIG. 1.

First of all, a call with another communication apparatus is established by using the communication module 12 (step S502). Next, a first voice in the call is recorded by the voice recording module 182, and a series of numbers appeared in the first voice recorded by the voice recording module 182 is recognized by the voice recognition module 184 (step S504). Then, the series of numbers recognized by the voice recognition module 184 is displayed on the display 14 by the display module 186 (step S506). Steps S502 to S506 in the present embodiment are identical as or similar to steps S202 to S206 in the foregoing embodiment, and thus related description thereof is not repeated hereinafter.

Unlike the foregoing embodiment, in the communication apparatus 10 of the present embodiment, after the series of numbers is displayed by the display module 186, for example, the voice recording module 182 receives a re-confirm operation of the user (e.g., which is performed by tapping the re-confirm button 33 in FIG. 3) by using the input device 16 (step S508) and accordingly records a second voice in the call. Then, the voice recognition module 184 recognizes a series of numbers appeared in the second voice recorded by the voice recording module 182 (step S510).

It should be noted that, in the present embodiment, the processor 20 of the communication apparatus 10 may further execute an error-detecting module (not illustrated) stored in the storage device 18. Then, the series of numbers recognized by the voice recognition module 184 in the first voice is compared with the series of numbers in the second voice by the error-detecting module (step S512). Lastly, the series of numbers recognized by the voice recognition module 184 in the second voice is displayed on the display 14 of the communication apparatus 10 by the display module 186, and numbers in the series of numbers in the second voice which are different from the series of numbers in the first voice are marked by the error-detecting module (step S514).

Figure 6:
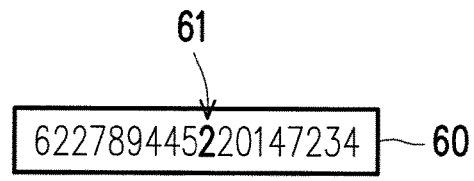
FIG. 6 is an example for sharing a series of numbers during a call according to an embodiment of the invention.

For instance, FIG. 6 is an example for sharing a series of numbers during a call according to an embodiment of the invention. Referring to FIG. 6, after comparing the series of numbers in the first and second voices, the error-detecting module discovers that a number 61 among a series of numbers 60 in the second voice is different from the corresponding number among the series of numbers in the first voice, and marks the number 61 by using boldface letter or other highlighting colors. Accordingly, the user is able to quickly identify the inconsistent number, so as to confirm or change the recognized numbers.

It should be noted that, in the case where multiple series of numbers are read by the user in the call, the voice recognition module 184 according to the present embodiments of the invention may recognize the multiple series of numbers appeared in the first voice according to a preset time interval, so that the display module 186 may display the recognized multiple series of numbers in separate paragraphs on the display 14 of the communication apparatus 10. Herein, a time interval between adjacent two series of numbers among the multiple series of numbers exceeds the preset time interval, and a time interval between adjacent two numbers in each of the multiple series of numbers does not exceed the preset time interval.

Figure 7A:
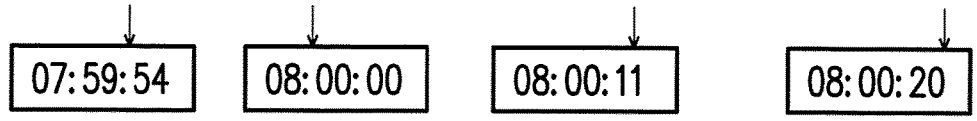
FIG. 7A and FIG. 7B are examples for sharing a series of numbers during a call according to an embodiment of the invention.
Figure 7B:
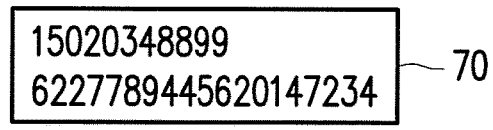

For instance, FIG. 7A and FIG. 7B are examples for sharing a series of numbers during a call according to an embodiment of the invention. Referring to FIG. 7A, it is assumed that a voice recorded by the communication apparatus is "My phone number is 15020348899. And, my card number is 622789445620147234". In this case, the communication apparatus records a time stamp for each number, and recognizes the multiple series of numbers in the voice according to a preset time interval (e.g., ten seconds). In view of the time stamps shown in FIG. 7A, it is known that, in "15020348899" recognized by the communication apparatus, the time interval between the first number 1 and the last number 9 are six seconds, and the time interval between each adjacent two numbers in "15020348899" does not exceed ten seconds. As such, "15020348899" is defined as one series of numbers. Further, in the "622789445620147234" recognized by the communication apparatus, the time interval between the first number 6 and the last number 4 are nine seconds, and the time interval between each adjacent two numbers in "622789445620147234" does not exceed ten seconds. As such, "622789445620147234" is defined as another series of numbers. However, the time interval between the last number 9 in "15020348899" and the first number 6 in "622789445620147234" is eleven seconds. Accordingly, because this time interval exceeds ten seconds, the communication apparatus determines the "15020348899" and "622789445620147234" as two series of numbers. Therefore, the two series of numbers are displayed in separate paragraphs on the display (e.g., a number display 70 shown in FIG. 7B). It is noted that, the communication apparatus will combines "15020348899" and "622789445620147234"

as the same series of numbers if the time interval between aforesaid numbers 9 and 6 does not exceed ten seconds. Moreover, in an embodiment, the communication apparatus may further recognize a keyword (e.g., "phone number" and "card number") appeared in front of the two series of numbers. As such, by adding the corresponding keyword in front of the series of numbers displayed in separate paragraphs, the user who received the series of numbers is able to understand the meaning of the series of numbers.

On the other hand, in the case where other texts are included between adjacent two series of numbers, the communication apparatus 10 may further recognize a keyword between the two series of numbers, so as to perform further actions on the two series of numbers. Specifically, the voice recognition module 184 in the communication apparatus 10 may recognize the two series of numbers appeared in the first voice and a text between the two series of numbers, and determine whether the text is one of a plurality of preset keywords, for example. Herein, if the text is the keyword, the voice recognition module 184 may perform actions corresponding to the recognized keyword on the recognized two series of numbers.

For instance, the keyword may be a quantifier including "multiplicative numbers", such as double, triple and so on. If the voice recorded by the voice recording module 182 is "triple 2, and quadruple 1", the voice recognition module 184 may recognize that "multiplicative numbers" (i.e., "triple" and "quadruple") in the voice are the keywords, so that the voice may be converted into a series of numbers "2221111". The keyword may be a text with meaning of repeat, such as "I repeat", "again" and the like. If the voice recorded by the voice recording module is "15020348898. I repeat, 15020348899", the voice recognition module may recognize that "I repeat" in the voice is the keyword, and compare both series of numbers appeared respectively preceding to and succeeding to "I repeat", so as to recognize inconsistent numbers. Lastly, the series of numbers "15020338899" appeared succeeding to the keyword is displayed on the communication apparatus and the last number "9" therein which is inconsistent is marked by using boldface letter or highlighting colors. The keyword may also be a text with the meaning of negation, such as "negative", "no" and so on. If the voice recorded by the voice recording module is "1235. Oh, negative, it should be 1234", the voice recognition module may recognize that "negative" therein is the keyword, so that the series of numbers appeared preceding to "negative" may be deleted and only the series of numbers "1234" appeared succeeding to "negative" is displayed.

In summary, the method and the communication apparatus for sharing a series of numbers during a call of the invention are capable of rapidly and correctly transferring the numbers by recognizing the series of numbers of the user in the call and displaying the same on the device of both sides. Further, by transmitting the recognized series of numbers to the device of the opposite side for displaying/recording, the opposite side can search it conveniently while saving the trouble of finding pen and paper for recording. As a result, the call convenience may be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for sharing a series of numbers during a voice call, adapted to a first communication apparatus with calling function, and comprising:
    establishing the voice call between the first communication apparatus and a second communication apparatus, wherein a first user of the first communication apparatus and a second user of the second communication apparatus talk to each other through the voice call;
    performing, during the voice call, a recognition procedure on a first voice in the voice call to recognize a first series of numbers appeared in the first voice by the first communication apparatus;
    displaying, during the voice call, the recognized first series of numbers on a display of the first communication apparatus by the first communication apparatus; and
    in response to receiving a sending operation of the first user during the voice call, sending the recognized first series of numbers to the second communication apparatus during the voice call, wherein the received recognized first series of numbers is displayed by the second communication apparatus.

2. The method according to claim 1, wherein the step of performing the recognition procedure on the first voice in the voice call comprises:
    receiving an activate operation of the first user in the voice call and accordingly activating the recognition procedure for the first voice.

3. The method according to claim 2, wherein the step of receiving the activate operation of the first user in the voice call and accordingly activating the recognition procedure for the first voice comprises:
    activating a record function to record the first voice before performing the recognition procedure.

4. The method according to claim 1, wherein the step of performing the recognition procedure on the first voice in the voice call comprises:
    activating a record function to record the first voice before performing the recognition procedure.

5. The method according to claim 1, wherein after the step of recognizing the first series of numbers appeared in the first voice, the method further comprises:
    sending the recognized first series of numbers to the second communication apparatus to record the first series of numbers into the second communication apparatus.

6. The method according to claim 1, wherein the method further comprises:
    receiving a cancel operation of the first user to cancel sending the first series of numbers to the second communication apparatus.

7. The method according to claim 1, wherein after the step of displaying the recognized first series of numbers on the display of the first communication apparatus, the method further comprises:
    receiving a re-confirm operation of the first user and accordingly performing the recognition procedure on a second voice in the voice call to recognize a second series of numbers appeared in the second voice;
    comparing the first series of numbers in the recognized first voice with the second series of numbers in the second voice; and
    displaying the second series of numbers in the second voice on the display of the first communication apparatus, and marking numbers in the second series of numbers of the second voice which are different from the first series of numbers in the first voice.

8. The method according to claim 1, wherein the step of recognizing the first series of numbers appeared in the first voice comprises:
- recognizing two series of numbers appeared in the first voice and a text between the two series of numbers;
- determining whether the text is one of a plurality of preset keywords;
- performing actions corresponding to the keyword on the recognized two series of numbers if the text is the keyword.

9. The method according to claim 1, wherein the steps of recognizing the first series of numbers appeared in the first voice, and displaying the recognized first series of numbers on the display of the first communication apparatus comprise:
- recognizing multiple series of numbers appeared in the first voice according to a preset time interval, and displaying the recognized multiple series of numbers in separate paragraphs on the display of the first communication apparatus, wherein a time interval between adjacent two series of numbers among the multiple series of numbers exceeds the preset time interval, and a time interval between adjacent two numbers in each of the multiple series of numbers does not exceed the preset time interval.

10. The method according to claim 1, wherein the step of sending the recognized first series of numbers to the second communication apparatus during the voice call further comprises:
- determining whether a connection to a wireless network is established;
- transmitting the first series of numbers in form of an instant message to the second communication apparatus if the connection to the wireless network is established; and
- transmitting the first series of numbers in form of a short message to the second communication apparatus via a cellular network if the connection to the wireless network is not established.

11. A first communication apparatus, comprising:
- a transmitter and a receiver (transmitter-receiver), wherein the first communication apparatus is configured to establish a voice call between the first communication apparatus and a second communication apparatus by using the transmitter-receiver, wherein a first user of the first communication apparatus and second user of the second communication apparatus talk to each other through the voice call;
- a display;
- an input device;
- a storage device, storing a plurality of programs; and
- a processor, coupled to the transmitter-receiver, the display, the input device and the storage device, loading and executing the programs in the storage device for implementing sharing a series of numbers during the established voice call, the processor is configured for:
- recognizing a first series of numbers appeared in a first voice in the voice call during the voice call;
- displaying the recognized first series of numbers on the display during the voice call; and
- receiving a sending operation of the first user by using the input device during the voice call and accordingly sending the recognized first series of numbers to the second communication apparatus by using the transmitter-receiver during the voice call, wherein the received recognized first series of numbers is displayed by the second communication apparatus.

12. The first communication apparatus according to claim 11, wherein the processor is further configured for:
- recording the first voice in the voice call.

13. The first communication apparatus according to claim 12, wherein the processor is further configured for:
- receiving a record operation performed by the first user in the voice call by using the input device and accordingly recording the first voice.

14. The first communication apparatus according to claim 11, wherein the processor is further configured for:
- sending the recognized first series of numbers to the second communication apparatus so as to record the first series of numbers into the second communication apparatus.

15. The first communication apparatus according to claim 11, wherein the processor is further configured for:
- receiving a cancel operation of the first user by using the input device so as to cancel sending the first series of numbers to the second communication apparatus.

16. The first communication apparatus according to claim 11, wherein the processor is further configured for:
- receiving a re-confirm operation of the first user by using the input device and accordingly recognizes a second voice in the voice call so as to recognize a second series of numbers appeared in the second voice;
- comparing the first series of numbers in the recognized first voice with the second series of numbers in the second voice; and
- displaying the recognized second series of numbers in the second voice on the display of the communication apparatus, and marking numbers in the second series of numbers in the second voice compared which are different from the first series of numbers in the first voice.

17. The first communication apparatus according to claim 11, wherein the processor is further configured for:
- recognizing two series of numbers appeared in the first voice and a text between the two series of numbers, and determining whether the text is one of a plurality of preset keywords,
- performing actions corresponding to the keyword on the recognized two series of numbers if the text is the keyword.

18. The first communication apparatus according to claim 11, wherein the processor is further configured for:
- recognizing multiple series of numbers appeared in the first voice according to a preset time interval and displaying the recognized multiple series of numbers in separate paragraphs on the display of the first communication apparatus, wherein a time interval between adjacent two series of numbers among the multiple series of numbers exceeds the preset time interval, and a time interval between adjacent two numbers in each of the multiple series of numbers does not exceed the preset time interval.

19. The first communication apparatus according to claim 11, wherein the processor is further configured for:
- connecting, by using the transmitter-receiver, to a cellular network, and the first communication apparatus further comprises:
- a wireless network circuit, configured to connect to a wireless network,
- wherein the processor is further configured to determine whether a connection to the wireless network is established by the wireless network circuit, wherein
- the first series of numbers is transmitted in form of an instant message to the second communication apparatus by using the wireless network circuit if the connection to the wireless network is established; and
the first series of numbers is transmitted in form of a short message to the second communication apparatus by using the cellular network if the connection to the wireless network is not established.

\* \* \* \* \*